US011762863B2

(12) United States Patent
Johansen et al.

(10) Patent No.: US 11,762,863 B2
(45) Date of Patent: Sep. 19, 2023

(54) HIERARCHICAL CONTEXTUAL SEARCH SUGGESTIONS

(71) Applicant: Microsoft Technology Licensing, LLC, Redmond, WA (US)

(72) Inventors: Knut Kristian Johansen, Tromsø (NO); Bernt Ivar Olsen, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 250 days.

(21) Appl. No.: 15/783,582

(22) Filed: Oct. 13, 2017

(65) Prior Publication Data

US 2019/0114347 A1 Apr. 18, 2019

(51) Int. Cl.
*G06F 16/2457* (2019.01)
*G06F 16/248* (2019.01)
*G06F 16/95* (2019.01)

(52) U.S. Cl.
CPC ...... *G06F 16/24575* (2019.01); *G06F 16/248* (2019.01); *G06F 16/24578* (2019.01); *G06F 16/95* (2019.01)

(58) Field of Classification Search
CPC ......... G06F 16/24575; G06F 16/24578; G06F 16/95; G06F 16/248
See application file for complete search history.

(56) References Cited

U.S. PATENT DOCUMENTS 7,287,214 B1 * 10/2007 Jenkins ................. G06F 16/284
715/205
7,536,384 B2 5/2009 Venkataraman et al.
8,073,860 B2 12/2011 Venkataraman et al.
8,117,197 B1 2/2012 Cramer
8,849,786 B2 9/2014 Ebanks
(Continued)

FOREIGN PATENT DOCUMENTS

WO 2014059347 A1 4/2014

OTHER PUBLICATIONS

Golzari, Shooresh, "Out of the box SharePoint search relevancy rankings", https://www.tfpl.com/out-of-the-box-sharepoint-search-relevancy-rankings/. Published on: Feb. 20, 2012, 3 pages.
(Continued)

*Primary Examiner* — Hosain T Alam
*Assistant Examiner* — Anthony G Gemignani

(57) ABSTRACT

Examples of the present disclosure describe systems and methods relating to hierarchical contextual search suggestions. In an example, search suggestions may be provided to a user searching for content of a content management platform. In some examples, the content management platform may manage hierarchical content, such that search suggestions provided to the user for a search query may be associated with content at a level of the hierarchical content accessed by the user. If there is not a sufficient number of search suggestions to provide to the user at the current level of the hierarchy, additional and/or alternative search suggestions may be generated for the user based on content from a different level of the hierarchy. As a result, the user may continue to receive relevant search suggestions, while reducing the amount of computing overhead and analysis used to generate such search suggestions.

20 Claims, 12 Drawing Sheets

(56) References Cited

U.S. PATENT DOCUMENTS

| | | | |
|---|---|---|---|
| 9,268,857 | B2 | 2/2016 | Johnson et al. |
| 9,317,585 | B2* | 4/2016 | Heymans ............ G06F 16/9535 |
| 2001/0047355 | A1* | 11/2001 | Anwar .................. G06T 11/206 |
| 2007/0226640 | A1* | 9/2007 | Holbrook .............. G06F 16/951 |
| | | | 715/765 |
| 2008/0065649 | A1* | 3/2008 | Smiler .................. G06F 16/972 |
| 2008/0222129 | A1* | 9/2008 | Komatsu ............... G06F 16/288 |
| 2009/0018840 | A1* | 1/2009 | Lutz ....................... G01C 21/36 |
| | | | 704/270 |
| 2010/0332325 | A1 | 12/2010 | Holte |
| 2012/0102037 | A1* | 4/2012 | Ozonat ................. G06F 16/334 |
| | | | 707/738 |
| 2013/0191400 | A1* | 7/2013 | Tao ....................... G06F 16/951 |
| | | | 707/749 |
| 2015/0142773 | A1* | 5/2015 | Mindnich ......... G06F 16/24544 |
| | | | 707/714 |
| 2015/0379010 | A1* | 12/2015 | Allen .................. G06F 16/3338 |
| | | | 707/731 |
| 2016/0210300 | A1* | 7/2016 | Plakhov .............. G06F 16/3322 |
| 2016/0299972 | A1* | 10/2016 | Samdani ............... G06F 16/951 |
| 2016/0317077 | A1* | 11/2016 | Sillay ....................... H04L 63/10 |
| 2017/0091343 | A1* | 3/2017 | Shorina ................. G06F 16/242 |
| 2017/0169111 | A1* | 6/2017 | Baum .................... G06F 16/217 |

OTHER PUBLICATIONS

Finesilver, et al., "User Behaviour in the Context of Structured Documents", In Proceedings of European Conference on Information Retrieval, Apr. 2003, pp. 104-119.

"International Search Report and Written Opinion Issued in PCT Application No. PCT/US2018/048657", dated Nov. 23, 2018, 12 Pages.

"Office Action Issued in European Patent Application No. 18769269.4", dated Feb. 22, 2022, 7 Pages.

"Search Tree", Retrieved From: https://en.wikipedia.org/w/index.php?title=Search%20tree&oldid=%20780341190, May 14, 2017, 4 Pages.

"Summons to Attend Oral Proceedings Issued in European Patent Application No. 18769269.4", dated Nov. 21, 2022, 9 Pages.

"Link Prefetching", Retrieved From: https://en.wikipedia.org/w/index.php?%20title=Link_prefetching&oldid=804781550, Oct. 11, 2017, 4 Pages.

"Office Action Issued in European Patent Application No. 18769269.4", dated Mar. 22, 2023, 13 Pages.

* cited by examiner

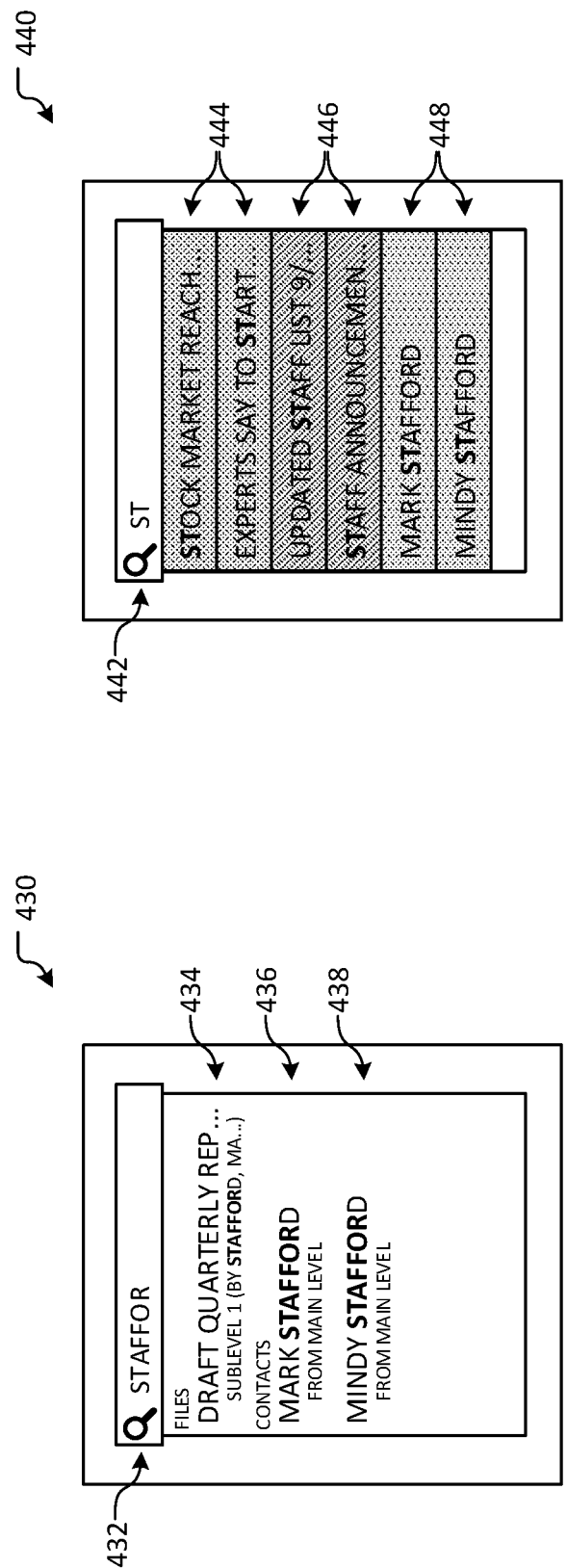

HIERARCHICAL CONTEXTUAL SEARCH SUGGESTIONS

BACKGROUND

A user may search for content within a content management platform. As the user searches, search suggestions may be provided to aid the user in identifying relevant content for the context in which the user is searching. However, determining an appropriate scope for which to generate useful and/or relevant suggestions while also balancing performance considerations may be difficult, especially in examples wherein the content management platform manages a large amount of content.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to hierarchical contextual search suggestions. In an example, search suggestions may be provided to a user searching for content of a content management platform. In some examples, the content management platform may manage hierarchical content, such that search suggestions provided to the user for a search query may be associated with content at a level of the hierarchical content accessed by the user. The search suggestions may be generated and/or ranked based on context information, which may comprise information relating to one or more levels of hierarchical content, to the user, to users associated with the user, and/or to a user's device.

If there is not a sufficient number of search suggestions to provide to the user at the current level of the hierarchy, additional and/or alternative search suggestions may be generated for the user based on content from a different level of the hierarchy, thereby providing search suggestions that are still relevant to the search query. In an example, search suggestions may be dynamically generated by a content management platform, or may be pre-generated and cached local to the client device so as to reduce latency while the user is formulating the search query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 4A-4D illustrate an overviews of example user interface elements according to aspects disclosed herein.

DETAILED DESCRIPTION

Figure 1:
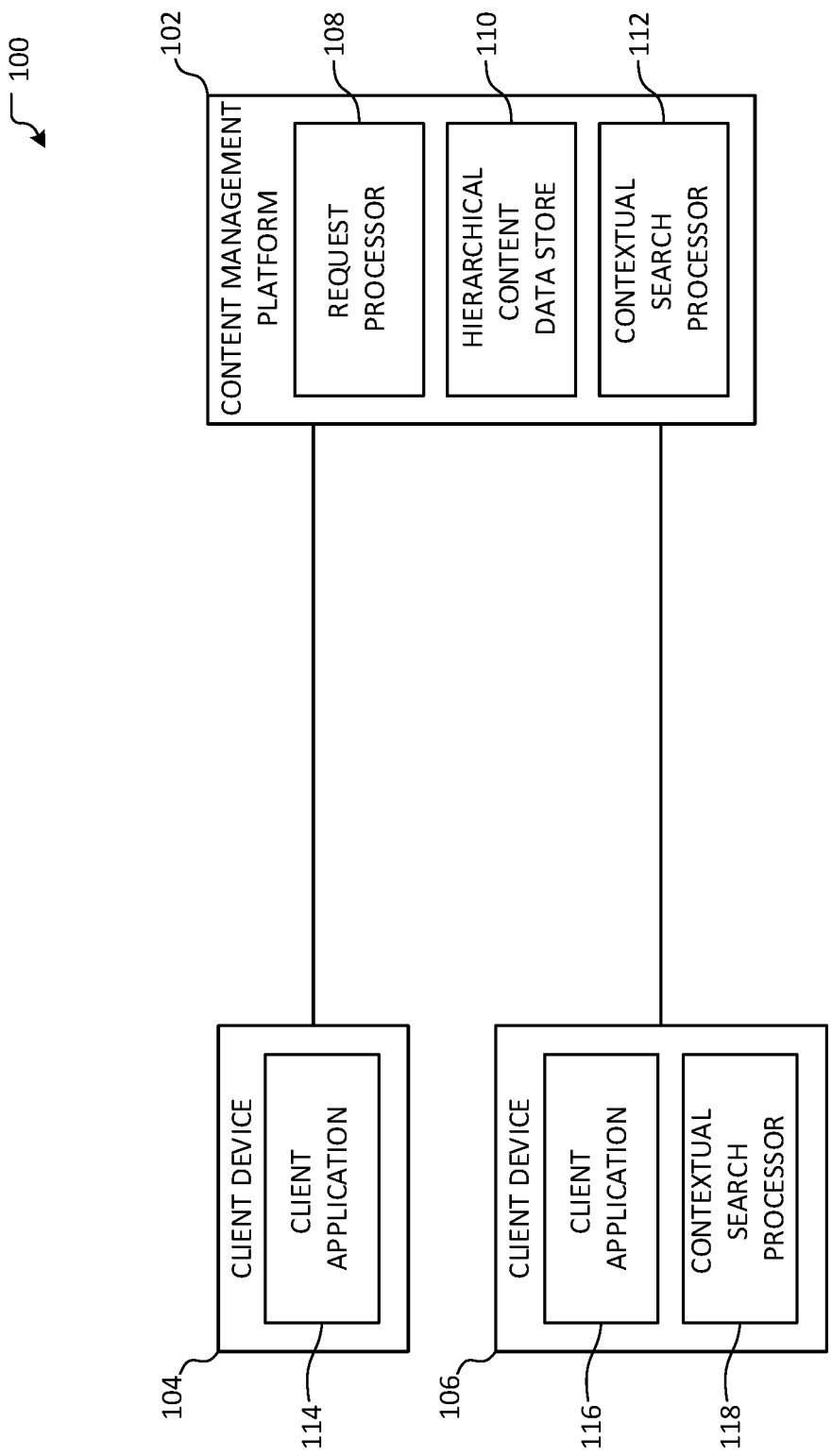
FIG. 1 illustrates an overview of an example system for generating hierarchical contextual search suggestions.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a user may search for content within a content management platform, which may comprise hierarchical content. As an example, hierarchical content may comprise content that is structured, organized, and/or accessed hierarchically, wherein content at one level of the hierarchy may be associated with similar, related, and/or more specific content at a sublevel of the hierarchy. It will be appreciated that any number of levels may be used. When searching within the content management platform, the user may intend to search for content associated with content at the user's current level of the hierarchy. For example, if a user is browsing content associated with a news sublevel of the hierarchical content, the user may similarly intend to search for content associated with the news sublevel. Accordingly, suggestions may be generated that relate to the news sublevel. However, in some examples, it may not be possible to generate a sufficient number (e.g., as compared to a predetermined threshold, a preference indication, etc.) of relevant suggestions that relate to the news sublevel. As a result, it may be necessary to generate search suggestions using a different scope within the content management platform.

Accordingly, the present disclosure provides systems and methods for generating a set of hierarchical contextual search suggestions. As an example, context information may be evaluated to generate one or more search suggestions based on at least a part of a search query received from a user. For example, the context information may indicate content associated with a level of the content hierarchy for which search suggestions should be generated. In some examples, it may not be possible to generate a sufficient number of search suggestions. For example, there may not be enough available and/or relevant content, or the user may not have adequate permissions to access a part of the content management platform, among other reasons. As such, according to aspects disclosed herein, search suggestions may be generated based on content at one or more different levels of the content hierarchy. For example, if the hierarchy level indicated by the context information is a sublevel, one or more parent levels associated with the sublevel may be used to generate search suggestions. As a result, relevant search suggestions may be provided to the user while still reducing the amount of possible content from which search suggestions may be generated. As compared to traditional techniques, this may reduce the computing resources used to generate search suggestions while also improving the ability of a computing device to identify and provide relevant search suggestions.

In an example, a content management platform may be an electronic collaboration platform, a website, an application, or a data store, among other examples. It will be appreciated that, in some examples, the content management platform may be comprised of a variety of subparts. For example, the content management platform may be comprised of both a website and an application, or an electronic collaboration platform and a data store. While example content management platforms are described herein, any of a variety of other types and/or configurations may be used according to aspects of the present disclosure.

A content management platform may manage hierarchical content. For example, hierarchical content may comprise any of a wide variety of data types, including, but not limited to, text data, image data, video data, messages, spreadsheets, presentations, webpages, and contact information. In some examples, at least a part of the hierarchical content may be represented and/or stored using one or more files, nodes and edges in a graph database, and/or a relational database, among other techniques.

As an example, a content management platform comprising an electronic collaboration platform may be comprised of one or more webpages that form a website. The website may be stored using a database. In some examples, a webpage may refer to a file, which may be stored in the database, using a storage device, or any combination thereof. The website may be structured hierarchically, such that certain webpages may be associated with other webpages. For example, a main webpage may comprise links to a variety of other webpages, such as a products webpage, a calendar webpage, a contacts list webpage, etc. The products webpage may comprise links to a variety of product webpages, while the calendar webpage may comprise one or more events, and the contacts list webpage may comprise information relating to one or more people. In such an example, the main webpage would be the highest level of the hierarchy, such that the product webpage, calendar webpage, and contacts list webpage are sublevels of the main page. Similarly, webpages for specific products associated with the product webpage may be referred to as a sublevel in relation to the level associated with the product webpage. Thus, there are three levels in the instant example.

A user may search for content within the content management platform. In an example, the user may indicate whether to search a part of the content management platform (e.g., one or more levels of hierarchical content, a branch of the hierarchical content, etc.) or may search the content management platform as a whole. When the user is inputting a search query at a device, search suggestions may be displayed by the device so as to aid the user with formulating the search query. For example, a set of search suggestions may be generated based on the search query (e.g., a partial search query, a subset of the user's entered query, etc.) and/or may be updated in response to the user updating the search query at the device.

Search suggestions may be generated based on context information. In an example, context information may comprise information relating to the user (e.g., permissions, browsing history, recently accessed content, most frequently accessed content, bookmarked content, etc.), information relating to users associated with the user (e.g., team members, users with which the user frequently communicates, users near the user, favorite users as may be indicated by the user, etc.), and/or information relating to the device (e.g., device type, device capabilities, a device location, a software version, a hardware version, etc.). In another example, context information may comprise information relating to content associated with a hierarchy level of hierarchical content. For example, the context information may be used to determine a scope of the hierarchical content from which to generate the search suggestions. While example types of context information are described herein, it will be appreciated that any of a wide variety of context information may be used to generate and/or rank search suggestions, among other actions.

In some examples, other levels of a hierarchy may be evaluated when generating the search suggestions. For example, other levels may be evaluated as a result of determining that more search suggestions should be provided to the user (e.g., based on the current number of search suggestions being below a threshold, as a result of receiving a request for additional search suggestions, etc.). In another example, other levels may be evaluated as a result of determining that the relevance of search suggestions generated based on the current level is below a threshold. It will be appreciated that any of a variety of hierarchical content associated with a level may be evaluated, including, but not limited to, hierarchical content associated with one or more levels above or below the current level, as well as hierarchical content on the same level as indicated by the context information.

FIG. 1 illustrates an overview of an example system for generating hierarchical contextual search suggestions. As illustrated, system 100 comprises content management platform 102, client device 104, and client device 106. Client applications 114 and 116 on client devices 104 and 106, respectively, may be used to access and/or interact with content management platform 102. In an example, content management platform 102 may comprise an electronic collaboration platform, a website, an application, a data store, or any combination thereof, among other examples. Client applications 114 and 116 may each be a native application, a web-based application, a plugin, and/or an operating system component, among other applications. Client devices 104 and 106 may each be any of a wide variety of computing devices, including, but not limited to, a desktop computing device, a laptop computing device, a mobile computing device, or a tablet computing device. While system 100 is illustrated as having two client devices 104 and 106 and one content management platform 102, it will be appreciated that any number of elements may be used according to aspects disclosed herein.

Content management platform 102 comprises request processor 108, hierarchical content data store 110, and contextual search processor 112. In an example, request processor 108 may process requests relating to content managed by content management platform 102. For example, request processor 108 may communicate with client application 114 and/or client application 116 of client devices 104 and 106, respectively. In some examples, request processor 108 may process requests to add content, modify content, access content, and/or remove content from content management platform 102, among other actions.

Content of content management platform 102 may be stored using hierarchical content data store 110. It will be appreciated that, while the content of content management platform 102 is referred to as hierarchical content, the content may be stored by hierarchical content data store 110 using any of a variety of techniques. As an example, hierarchical content data store 110 may store and/or represent content using one or more files, nodes and edges in a graph database, and/or a relational database, among other techniques. Content stored by hierarchical content data store 110 may comprise any of a wide variety of data types, including, but not limited to text data, image data, video data, messages, spreadsheets, presentations, webpages, and contact information.

When a user at one of client devices 104 or 106 performs a search for content of content management platform 102 (e.g., using client application 114 or 116, respectively), search suggestions may be provided for display to the user according to aspects disclosed herein. In an example, a set of search suggestions may be generated for the user by contextual search processor 112 based on content stored by hierarchical content data store 110. Contextual search processor 112 may generate search suggestions for at least a part of a user's search query based on context information associated with a user, wherein the context information may comprise information relating to the user (e.g., permissions, browsing history, recently accessed content, most frequently accessed content), users associated with the user (e.g., team members, users with which the user frequently communicates, users near the user, etc.), and/or the user's client device (e.g., device type, device capabilities, software version, etc.).

In another example, context information may comprise information relating to content associated with a hierarchy level of hierarchical content stored by hierarchical content data store 110. For example, the hierarchy level may be used to determine a scope of the hierarchical content from which to generate the set of search suggestions. In some examples, content associated with other hierarchy levels stored by hierarchical content data store 110 may be used in order to provide additional search suggestions when there are not a sufficient number of search suggestions available for the content indicated by the context information. In other examples, the request may indicate a number of search suggestions to receive and/or one or more hierarchy levels to evaluate. Accordingly, search suggestions generated by contextual search processor 112 may be provided to client device 104 or 106 for display to the user. As an example, request processor 108 may receive a request for search suggestions, and may respond to the request with one or more search suggestions generated by contextual search processor 112.

In another example, search suggestions may be generated at a client device or by a combination of a client device and content management platform 102. For example, client device 106 comprises contextual search processor 118, which may perform similar operations as were described above with respect to contextual search processor 112. In some examples, contextual search processor 112 may generate a ranked search suggestion data store, which may be provided to contextual search processor 118 of client device 106. As a result, contextual search processor 118 may be able to generate search suggestions based on the ranked search suggestion data store, which may thereby reduce the latency that may arise when requesting search suggestions from contextual search processor 112, which is remote from client device 106. In an example, the ranked search suggestion data store may be updated occasionally, such that data stored local to client device 106 remains up to date.

Figure 2:
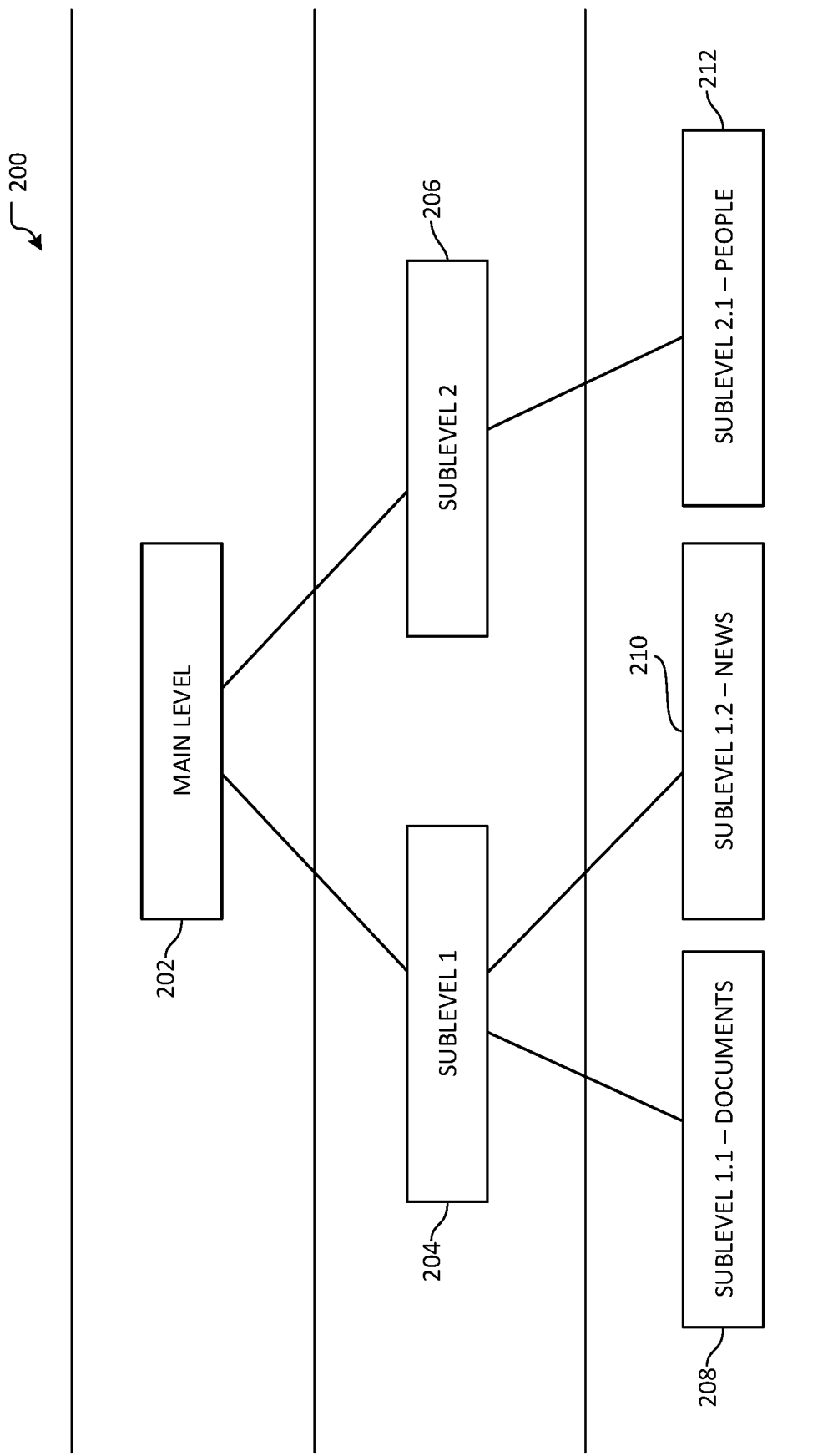
FIG. 2 illustrates an overview of an example content hierarchy.

FIG. 2 illustrates an overview of an example content hierarchy 200. In some examples, content hierarchy 200 may be stored by a hierarchical content data store, such as hierarchical content data store 110 in FIG. 1. As illustrated, content hierarchy is comprised of three hierarchy levels, wherein the first level is comprised of element 202, the second level is comprised of elements 204 and 206, and the third level is comprised of elements 208, 210, and 212. The lines in between the elements may indicate associations. For example, element 204 (i.e., "Sublevel 1") and element 206 (i.e., "Sublevel 2") are each associated with element 202 (i.e., "Main Level"). Similarly, element 208 (i.e., "Documents") and element 210 (i.e., "News") are each associated with element 204, while element 212 (i.e., "People") is associated with element 206.

Accordingly, elements 208, 210, and 212 may be referred to as comprising a sublevel as compared to the level at which elements 204 and 206 reside. Similarly, elements 204 and 206 may be referred to comprising a sublevel as compared to that of element 202. Thus, for example, if it is not possible to generate sufficient search suggestions for content associated with element 208, content associated with elements 204 and/or 202 may be used to generate search suggestions. In some examples, content associated with other elements of the same level may be used as well. For example, element 210 may be referred to as a "sibling" of element 208, in that both element 208 and element 210 are in the sublevel for element 204. Accordingly, content associated with element 210 may also be evaluated when generated search suggestions according to aspects disclosed herein.

It will be appreciated that content hierarchy 200 is provided as an example, and that any of a variety of other structures may be used. Further, a hierarchy need not be a tree as is illustrated by content hierarchy 200, but rather may be any arrangement of content, such that some content is associated with or grouped with a higher level of content.

Figure 3A:
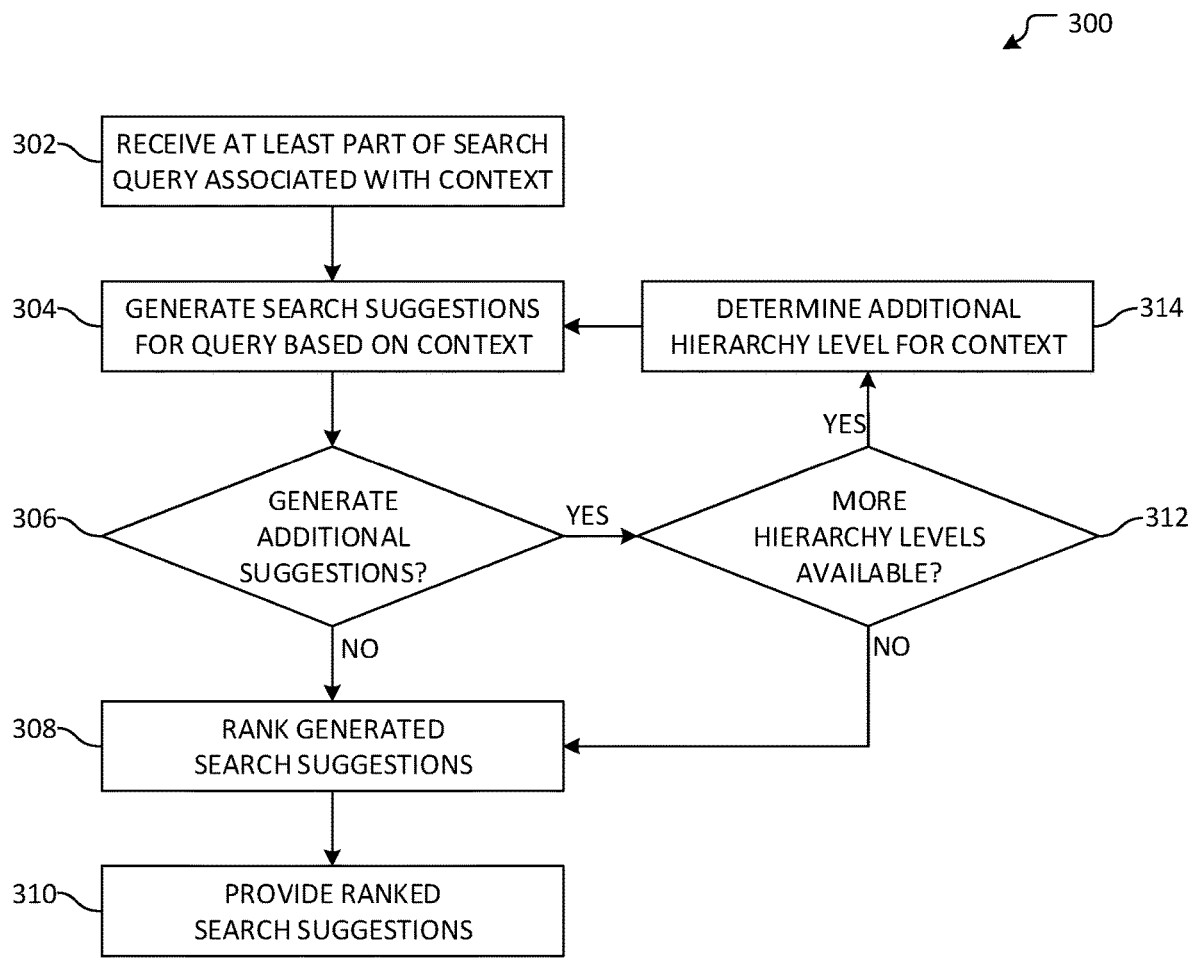
FIG. 3A illustrates an overview of an example method for generating hierarchical contextual search suggestions.

FIG. 3A illustrates an overview of an example method 300 for generating hierarchical contextual search suggestions. In some examples, method 300 may be performed by one or more computing devices, including, but not limited to, mobile computing devices, tablet computing devices, laptop computing devices, or server computing devices, or any combination thereof. In other examples, method 300 may be performed by aspects of content management platform 102 in FIG. 1.

Method 300 begins at operation 302, where at least part of a search query may be received, which may be associated with context information. As discussed above, context information may comprise a variety of information, including, but not limited to, information relating to a user, one or more users relating to the user, and/or information relating to content associated with a hierarchy level of hierarchical content. In an example, the received search query part may be a partial query, as may have been entered by a user at a client device when formulating a search query.

At operation 304, search suggestions for the search query may be generated based on the context information. In an example, generating search suggestions may comprise accessing an index associated with hierarchical content in order to identify one or more matches for the search query. In another example, generating search suggestions may comprise accessing a pre-generated data store comprising search suggestions. For example, the pre-generated data store may be associated with at least a subpart of the hierarchical content (e.g., content relating to a level of the hierarchical content, content relating to a branch of the hierarchical content, etc.), such that the pre-generated data store may be determined based on the received context information. In some examples, a search may be performed within the hierarchical content in order to generate the search suggestions. While example techniques are described herein, it will be appreciated that any of a variety of techniques may be used to generate search suggestions.

Flow progresses to determination 306, where it may be determined whether additional suggestions should be generated. In an example, the determination may comprise evaluating the quantity of the generated search suggestions (e.g., as compared to a predetermined threshold, a threshold indication received at operation 302, etc.) or the quality of the generated search suggestions (e.g., based on a relevancy metric, based on analyzing the search suggestions using the received context information, etc.), among other factors. It will be appreciated that additional or alternative factors may be evaluated when determining whether additional suggestions should be generated.

If it is determined that additional suggestions should not be generated, flow branches "NO" to operation 308, where the generated search suggestions may be ranked. In an example, the generated search suggestions may be ranked based on the received context information (e.g., based on relevance, based on whether a suggestion was recently used or is frequently accessed, etc.). In another example, the search suggestions may be ranked alphabetically or chronologically. While example ranking techniques are described herein, it will be appreciated that other techniques may be used. In another example, operation 308 may be omitted, such that the search suggestions are not ranked or, in some instances, the search suggestions may have been previously ranked (e.g., as a result of pre-processing or indexing, etc.).

Flow progresses to operation 310, where the ranked search suggestions are provided. In an example, the ranked search suggestions may be provided to the client device of the user, such that the client device may display them to the user. In some examples, the ranked search suggestions may be provided directly to the client device, while in other examples, the ranked search suggestions may be provided to a request processor (e.g., request processor 108 in FIG. 1), which may then in turn provide the search suggestions to the client device. Flow terminates at operation 310.

If, however, it is determined that additional suggestions should be generated, flow branches "YES" to determination 312, where it may be determined whether there are more hierarchy levels available within the hierarchical content. In an example, the determination may comprise evaluating the context information to determine the content indicated by the context information. For example, the hierarchical level of the content may be evaluated, in order to determine whether there is a higher level from which to generate search suggestions. As an example, if the context information indicates the content is associated with element 210 in FIG. 2, the determination may evaluate whether there is a higher level (e.g., such as the levels of elements 204 and 202) from which to generate search suggestions. If it is determined that there are no more hierarchy levels available, flow branches "NO" to operation 308, which was discussed above.

If, however, it is determined that there are more hierarchy levels available, flow branches "YES" where an additional hierarchy level may be determined and incorporated as part of the context information with which search suggestions may be generated. In some examples, multiple hierarchy levels may be incorporated. In an example, determining an additional hierarchy level may comprise evaluating content at one or more levels that are higher and/or lower than the current hierarchy level. As an example, if the context information indicates a hierarchy level associated with element 204 in FIG. 2, the analysis may comprise evaluating element 202 (e.g., a higher level) and/or elements 208 and 210 (e.g., a lower level). In another example, the determination may comprise evaluating content at a similar level. Thus, continuing with the example based on FIG. 2, the evaluation may comprise evaluating element 206. The context information may be updated to incorporate the additional one or more hierarchy level, wherein incorporating the hierarchy levels may comprise adding, revising, and/or replacing level information of the context information. It will be appreciated that while example techniques are described herein, the evaluation may comprise evaluating other aspects of hierarchal content.

Flow then progresses from operation 314 to operation 304, where search suggestions may be generated based on the updated context information. Flow may continue to loop until a sufficient number of search suggestions are generated. In some examples, flow may stop looping if it is determined at determination 306 that it is not possible to generate a sufficient number of suggestions, such that the current set of search suggestions may be provided. Flow ultimately terminates at operation 310.

Figure 3B:
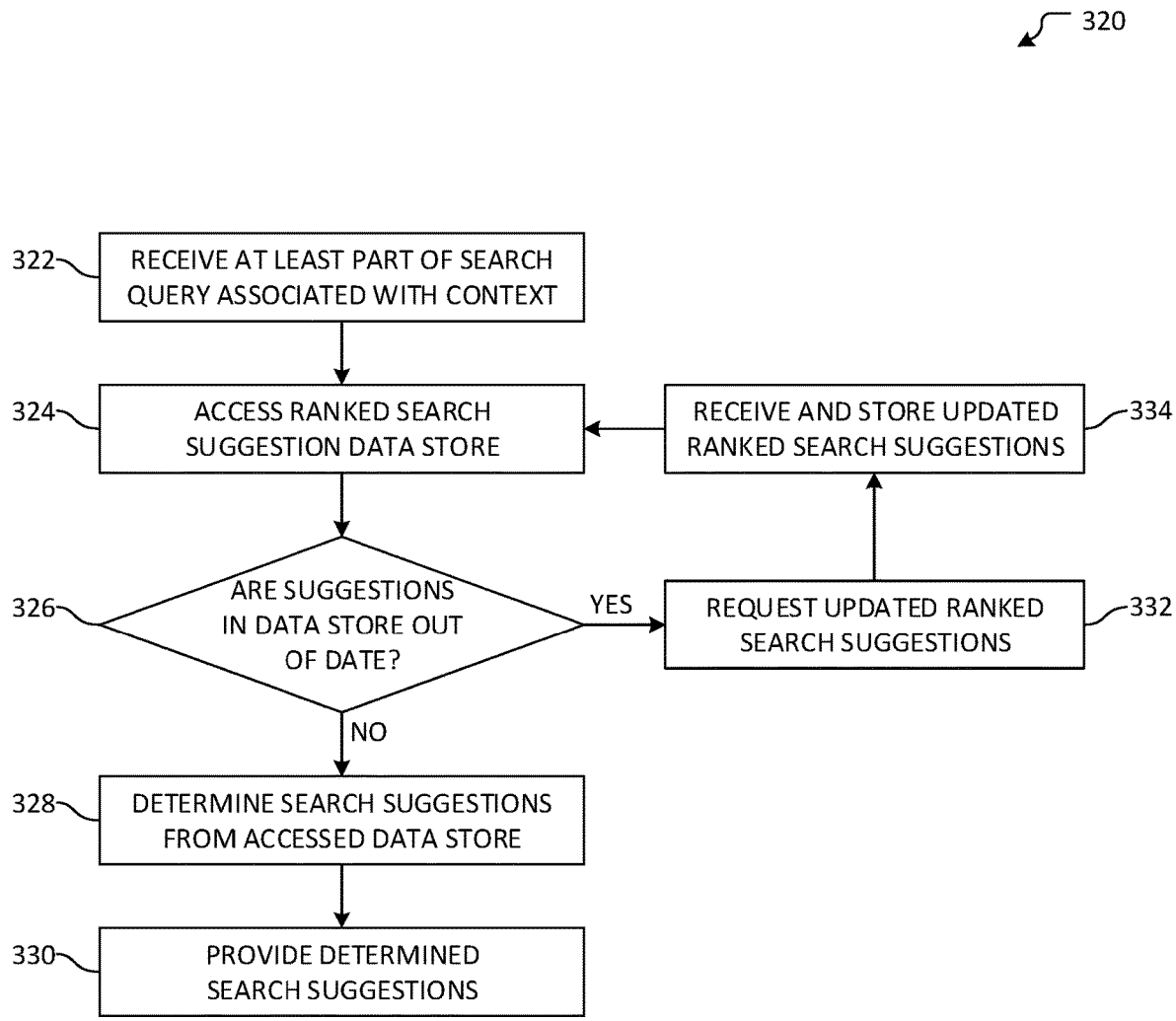
FIG. 3B illustrates an overview of an example method for generating hierarchical contextual search suggestions based on a ranked search suggestion data store.

FIG. 3B illustrates an overview of an example method 320 for generating hierarchical contextual search suggestions based on a ranked search suggestion data store. In some examples, method 320 may be performed by one or more computing devices, including, but not limited to, mobile computing devices, tablet computing devices, laptop computing devices, or server computing devices, or any combination thereof. In other examples, method 320 may be performed by a client device such as one of client devices 104 and 106 in FIG. 1. Method 320 may be performed by a client device in order to reduce latency that may otherwise exist if search suggestions are determined remotely.

Method 320 begins at operation 322, where at least part of a search query may be received, which may be associated with context information. As discussed above, context information may comprise a variety of information, including, but not limited to, information relating to a user, one or more users relating to the user, and/or information relating to content associated with a hierarchy level of hierarchical content. In an example, the received search query part may be a partial query, as may have been entered by a user at a client device when formulating a search query.

At operation 324, a ranked search suggestion data store may be accessed. In an example, the ranked search suggestion data store may have been generated by a content management platform, such as by contextual search processor 112 of content management platform 102 in FIG. 1. In some examples, the ranked search suggestion data store may comprise search suggestions for at least a part of hierarchical content stored by the content management platform. As an example, the ranked search suggestion data store may comprise ranked search suggestions relating to hierarchical content recently and/or frequently accessed by a user. It will be appreciated that while method 320 is described as an example having a search suggestion data store that is ranked, other example methods may use a search suggestion data store wherein the search suggestions are not ranked and/or are stored using any of a variety of techniques.

Flow progresses to determination 326, where it may be determined whether one or more suggestions stored by the ranked search suggestion data store are out of date. In an example, the determination may comprise evaluating an expiration timestamp or a time-to-live value associated with the search suggestions. In another example, the evaluation may comprise communicating with the content management platform in order to determine whether at least a part of the hierarchical content stored by the content management platform has changed. In some examples, the determination may comprise evaluating whether context information that was used to generate the ranked search suggestions has changed. It will be appreciated that other techniques may be used to determine whether the ranked search suggestion data store is out of date.

If it is determined that the search suggestions in the ranked search suggestion data store are not out of date, flow branches "NO" to operation 328, where one or more search suggestions may be determined from the ranked search suggestion data store. In an example, determining search suggestions from the data store may comprise identifying search suggestions in the data store relating to the search query that was received at operation 322. In another example, the data store may be filtered in order to identify relevant search suggestions. While example determination techniques are described herein, it will be appreciated that other techniques may be used to determine one or more search suggestions from the ranked search suggestion data store.

In some examples, the search suggestions may be determined based on the context information that was received at operation 322. For example, the determined search suggestions may be determined so as to identify suggestions that relate to content associated with a hierarchy level of hierarchical content. If a sufficient number of search suggestions are not determined from within the ranked search suggestion data store, hierarchical content associated with additional and/or alternative hierarchy levels may be identified in order to continue to provide relevant search suggestions according to aspects disclosed herein.

Flow progresses to operation 330, where the determined search suggestions may be provided. In an example, the ranked search suggestions may be provided to the client device of the user, such that the client device may display them to the user. In some examples, displaying the search suggestions may comprise providing an indication as to the content and/or hierarchy level of the hierarchical content to which they relate. Flow terminates at operation 330.

If, however, it is determined that the search suggestions in the ranked search suggestion data store are out of date, flow branches "YES" to operation 332, where updated ranked search suggestions may be requested. The request may comprise context information as described herein, which may be used to generate and/or rank the search suggestions. In an example, the request may be provided to a contextual search processor of a content management platform, such as contextual search processor 112 of content management platform 102 in FIG. 1. In some examples, the request may indicate a number of requested search suggestions or a ranking method, among other indications.

Flow progresses to operation 334, where updated ranked search suggestions may be received and stored. The received search suggestions may be stored in the ranked search suggestion data store. In some examples, previous entries in the ranked search suggestion data store may be removed or updated based on the received ranked search suggestions. Flow then continues from operation 324 as was described above in order to generate and provide search suggestions. Flow ultimately terminates at operation 330.

Figure 3C:
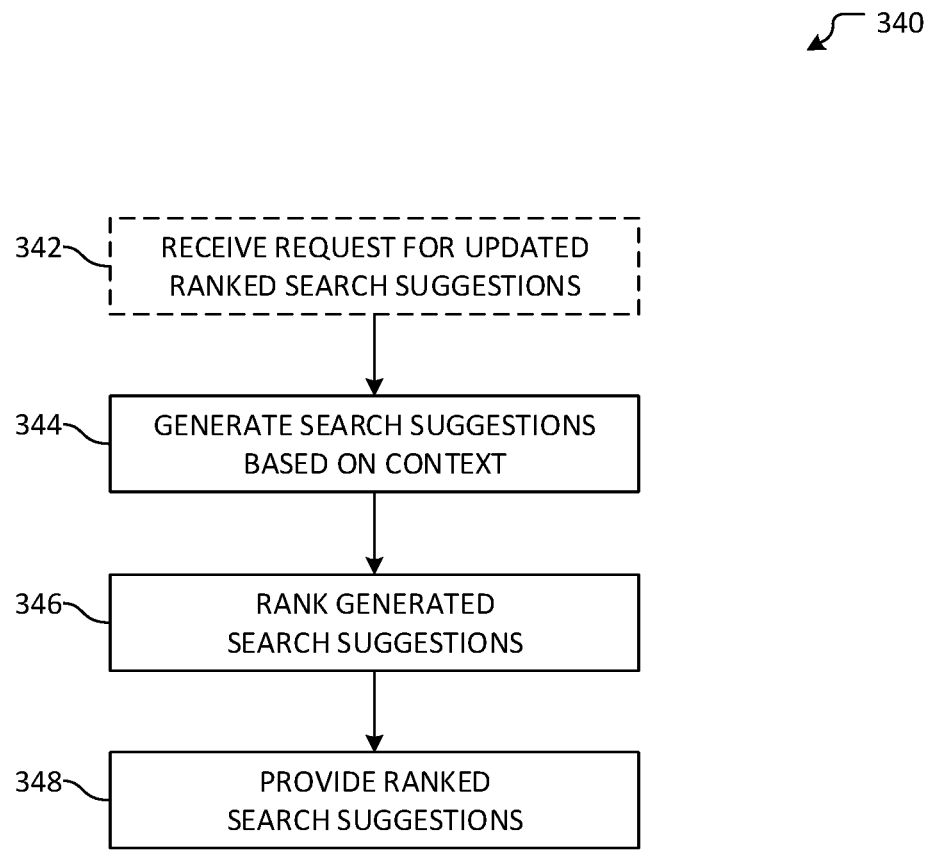
FIG. 3C illustrates an overview of an example method for generating a ranked search suggestion data store.

FIG. 3C illustrates an overview of an example method 340 for generating a ranked search suggestion data store. In some examples, method 340 may be performed by one or more computing devices, including, but not limited to, mobile computing devices, tablet computing devices, laptop computing devices, or server computing devices, or any combination thereof. In other examples, method 340 may be performed by a client device such as one of client devices 104 and 106 in FIG. 1. Method 340 may be performed by a content management platform when generating ranked search suggestions in response to a request for updated ranked search suggestions.

Method 340 begins at operation 342, where a request may be received for updated ranked search suggestions. In an example, the request may be received as a result of a determination that search suggestions stored in a data store are out of date. For example, an expiration timestamp or a time-to-live value associated with a search suggestion may cause a request to be received for updated search suggestions. In another example, the request may be received as a result of performing operation 332 as was discussed above with respect to method 320 in FIG. 3B. The request may comprise context information as described herein, which may be used to generate and/or rank the search suggestions. In some examples, the request may indicate a number of requested search suggestions or a ranking method, among other indications. Operation 342 is illustrated using a dashed box to indicate that operation 342 may be optional. In another example, operations 344-348 may be performed without first receiving such a request.

At operation 344, search suggestions may be generated based on context information. In an example, generating search suggestions may comprise accessing an index associated with hierarchical content in order to identify one or more matches for the search query. As described above, the context information may indicate content associated with a hierarchy level of the hierarchical content, such that the search suggestions may be generated to relate to the indicated content. In some examples, additional content may be evaluated, such as content relating to a higher or lower level of the hierarchy, as described herein. In some examples, a search may be performed within the hierarchical content in order to generate the search suggestions. While example techniques are described herein, it will be appreciated that any of a variety of techniques may be used to generate search suggestions.

Flow progresses to operation 346, where the generated search suggestions may be ranked. In an example, the generated search suggestions may be ranked based on the received context information (e.g., based on relevance, based on whether a suggestion was recently used or is frequently accessed, etc.). In another example, the search suggestions may be ranked alphabetically or chronologically. While example ranking techniques are described herein, it will be appreciated that other techniques may be used. In another example, operation 346 may be omitted, such that the search suggestions are not ranked or, in some instances, the search suggestions may have been previously ranked (e.g., as a result of pre-processing or indexing, etc.).

Moving to operation 348, where the ranked search suggestions are provided. In an example, the ranked search suggestions may be provided to the client device of the user, such that the client device may store them as part of a ranked search suggestion data store, and/or the client device display them to the user. In some examples, the ranked search suggestions may be provided directly to the client device, while in other examples, the ranked search suggestions may be provided to a request processor (e.g., request processor 108 in FIG. 1), which may then in turn provide the search suggestions to the client device. Flow terminates at operation 348.

FIGS. 4A-4D illustrate an overviews of example user interface elements according to aspects disclosed herein. As an example, a client device (e.g., client devices 104 and/or 106 in FIG. 1) may be used to present aspects of the example user interface elements to a user. The user may interact with the presented aspects in order to select a generated search suggestion, such that the selected search suggestion may be used as a query in order to return search results.

Figure 4B:
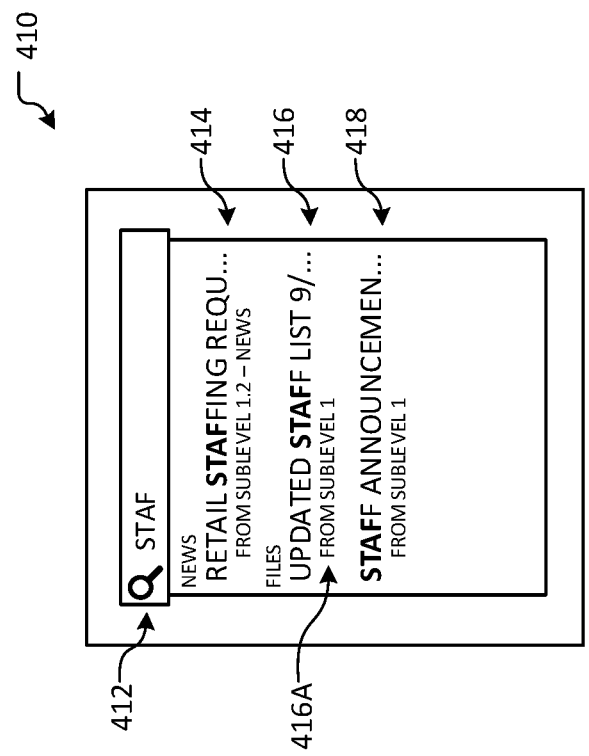
Figure 4A:
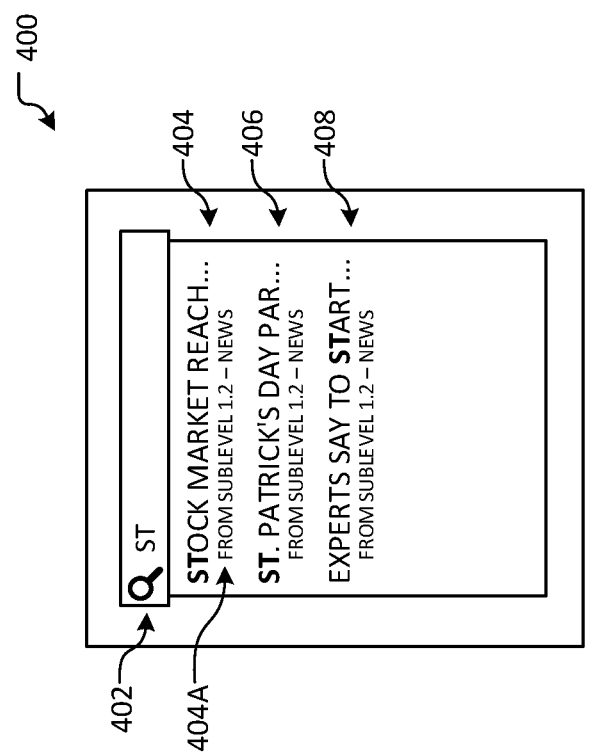

With reference to FIG. 4A, example user interface (UI) 400 comprises search box 402 and search suggestions 404, 406, and 408. Search suggestions 404, 406, and 408 may have been generated according to aspects disclosed herein based on the partial query (i.e., "ST") entered into search box 402. As illustrated, search suggestions 404, 406, and 408 comprise subtext used to indicate from where in the hierarchical content of the content management platform the search suggestion was generated. Using search suggestion 404 as an example, subtext 404A indicates that the search suggestion was generated from "Sublevel 1.2—News". With reference to FIG. 2, this may correspond to element 210 in content hierarchy 200.

As illustrated, all of search suggestions 404, 406, and 408 are from "Sublevel 1.2—News," as there are sufficient suggestions for the partial search query "ST" to generate suggestions. Turning now to FIG. 4B, the partial query in search box 412 has been updated to read "STAF." Search suggestion 414 is still from "Sublevel 1.2—News," but search suggestions 416 and 418 are now from "Sublevel 1." With brief reference to FIG. 2, Sublevel 1 is represented by element 204, which is associated with element 210 (i.e., "Sublevel 1.2—News"), but is one level above element 210. Accordingly, this may indicate that search suggestions are generated based on a different hierarchy level of the hierarchical content as a result of a sufficient number of search suggestions being unavailable from element 210. Further, search suggestions 414, 416, and 418 may be separated based on category (e.g., "News," "Files," etc.).

FIG. 4C illustrates UI 430 comprising an updated search query (i.e., "STAFFOR") in search box 432. Search suggestions 434, 436, and 438 have been updated accordingly. As illustrated, search suggestion 434 relates to "Sublevel 1," which, as described above, is one hierarchy level above the level from which the initial search suggestions were generated. However, search suggestions 436 and 438 are from "Main Level," thereby indicating that "Sublevel 1" has similarly been exhausted for relevant search suggestions. Thus, FIGS. 4A-C illustrate an example search suggestion interface in which an indication may be provided to the user regarding the hierarchy level from which search suggestions are generated.

UI 440 in FIG. 4D is illustrated a simplified example of a different technique that may be used to provide search suggestion source indications as were discussed with respect FIGS. 4A-4C. As illustrated, search box 442 comprises the partial search query "ST." The depicted search results are shaded to indicate that they may have been generated based on different hierarchy levels. For example, search results 444 may be shaded to indicate that they correspond to a user's currently-accessed content and hierarchy level, while search suggestions 446 may be shaded to indicate that they come from a higher level. Similarly, search suggestions 448 are illustrated as having yet a different shading, thereby indicating that the search suggestions are associated with yet a different level of the hierarchical content.

While example user interface and user experience techniques are described herein, it will be appreciated that a wide variety of other techniques may be used to present search suggestions to a user searching for content of a content management platform in conjunction with other aspects disclosed herein.

Figure 5:
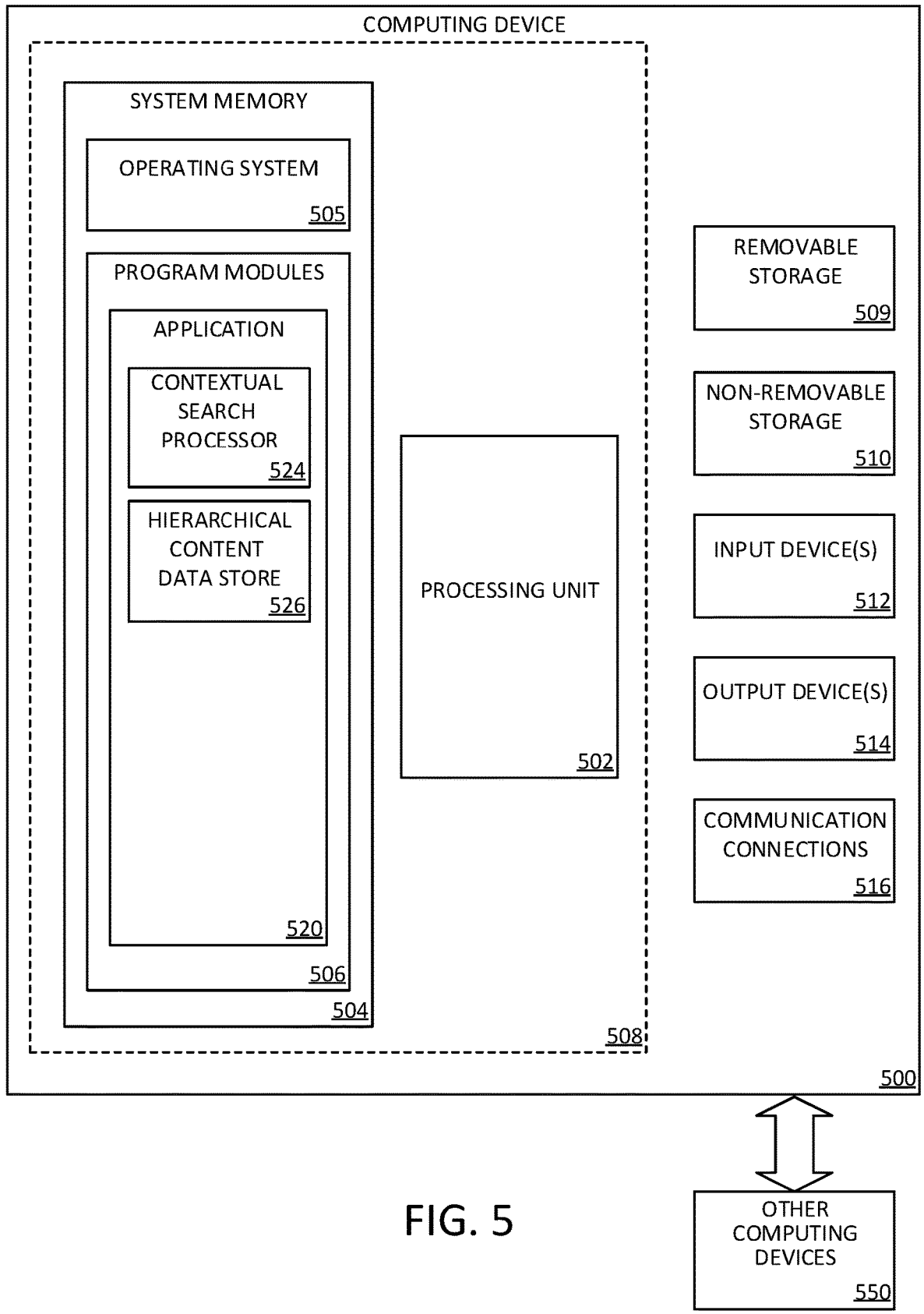
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for performing the various aspects disclosed herein such as contextual search processor 524 and hierarchical content data store 526. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
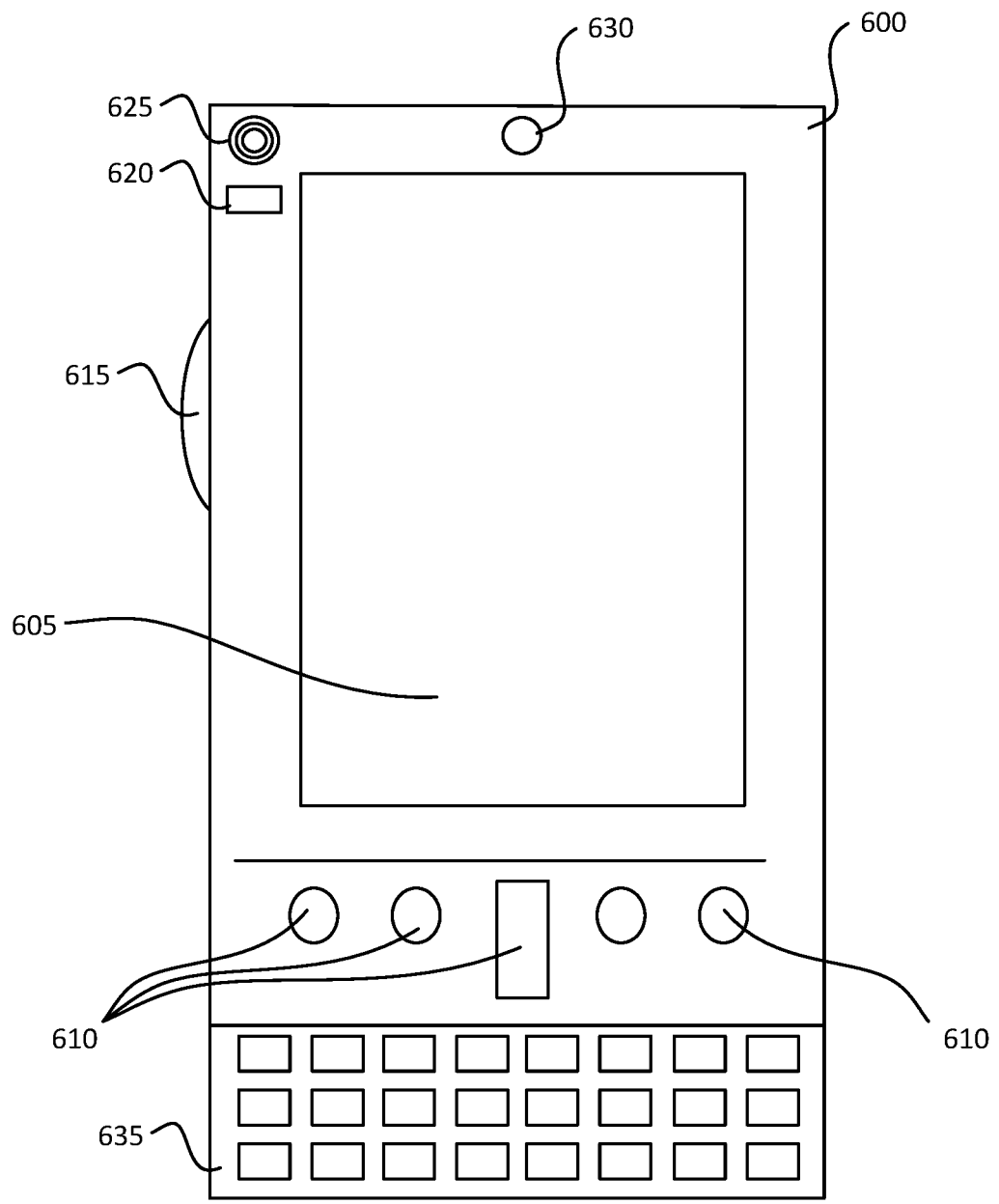
FIGS. 6A and 6B are simplified block diagrams of a mobile computing device with which aspects of the present disclosure may be practiced.
Figure 6B:
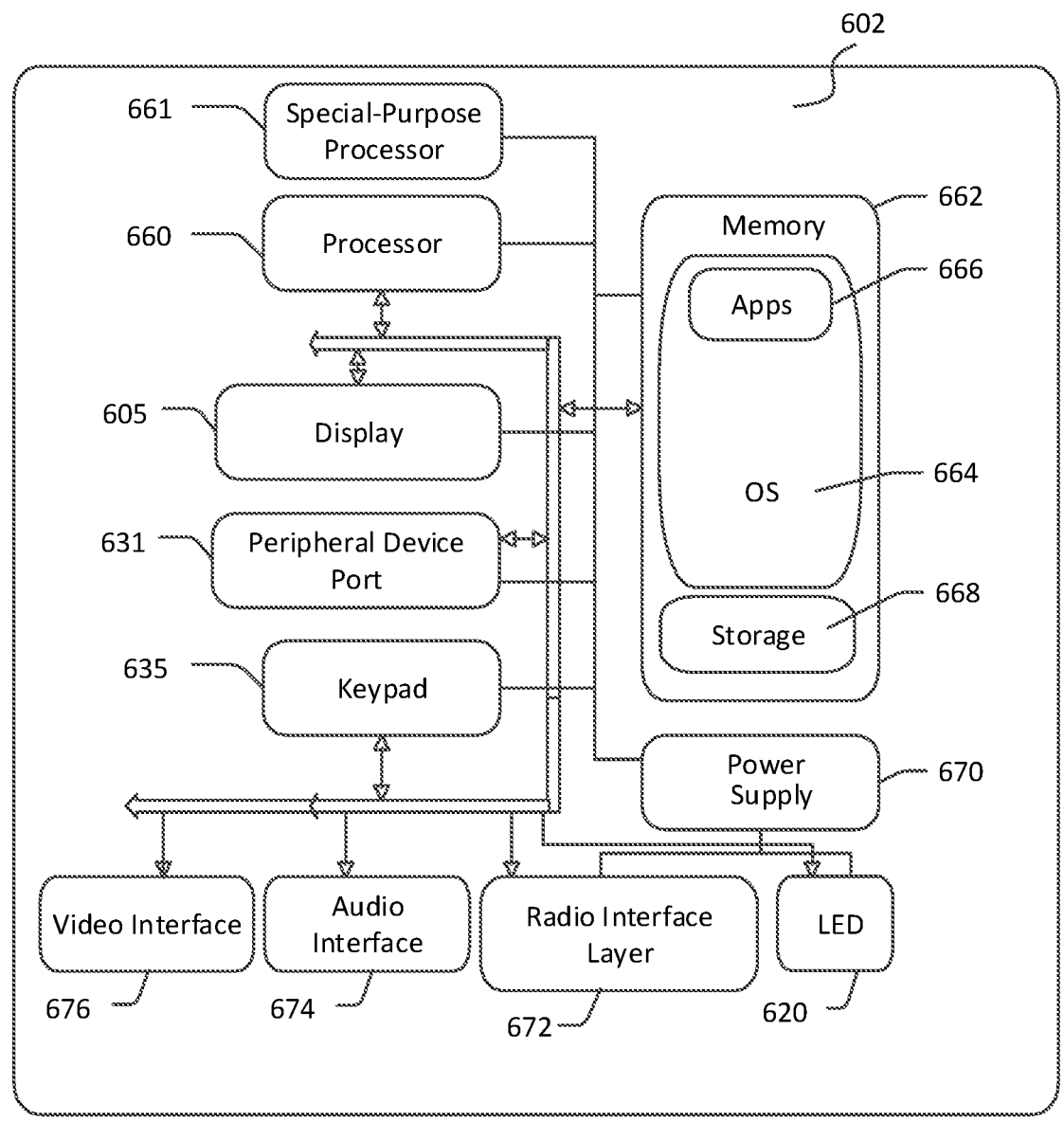

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports 631, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660, 661 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
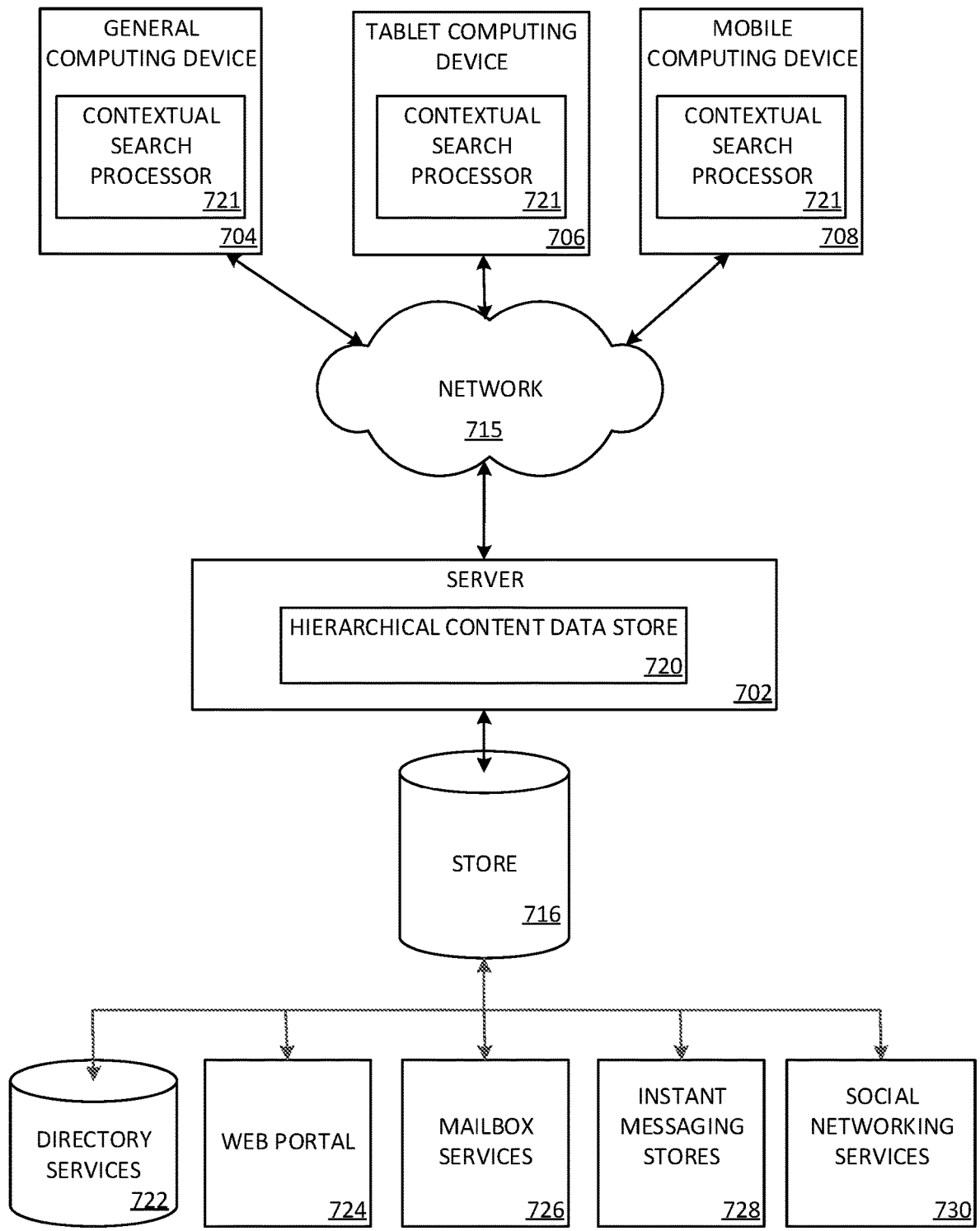
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. Contextual search processor 721 may be employed by a client that communicates with server device 702, and/or hierarchical content data store 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
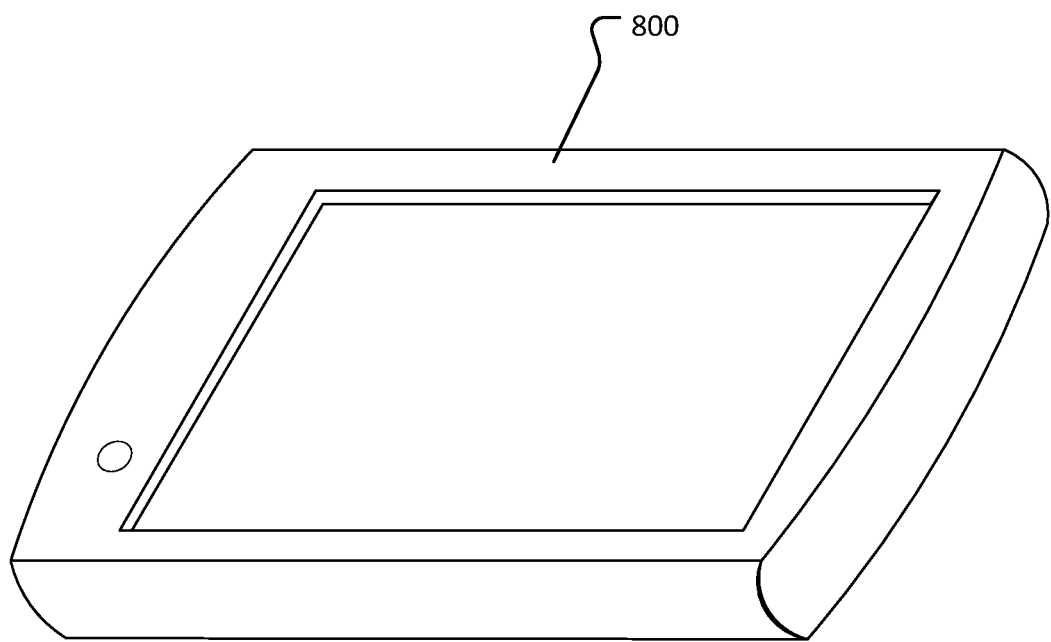
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving a search suggestion request, wherein the search suggestion request comprises a search query and context information indicating content within a data store comprising hierarchical content; generating a set of search suggestions based on the search query, wherein each suggestion of the set of search suggestions is associated with the indicated content; based on determining to generate additional search suggestions, identifying additional content within the data store associated with the indicated content, wherein the additional content is associated with a different level of the hierarchical content than the indicated content; generating additional search suggestions in the set of search suggestions based on the search query, wherein the additional search suggestions are associated with the additional content; and providing at least a part of the set of search suggestions in response to the search suggestion request. In an example, the set of operations further comprises: ranking the set of search suggestions based on the context information. In another example, the set of operations further comprises: evaluating a number of search suggestions in the set of search suggestions based on a predetermined threshold to determine whether to generate additional search suggestions. In a further example, the set of operations further comprises: evaluating one or more search suggestions of the set of search suggestions based on relevance to the search query to determine whether to generate additional search suggestions. In yet another example, providing at least a part of the set of search suggestions comprises providing information about a hierarchy level for at least one search suggestion of the set of search suggestions. In a further still example, providing at least a part of the set of search suggestions comprises selecting a number of search suggestions from the set of search suggestions based on a quantity indication in the received context information. In another example, the set of search suggestions comprises only search suggestions that are associated with the additional content.

In another aspect, the technology relates to a method for generating a set of search suggestions for a search query. The method comprises: receiving, at a computing device, a request for search suggestions, wherein the request comprises a search query and context information indicating content within a data store comprising hierarchical content; determining a set of search suggestions based on the search query, wherein the set of search suggestions is associated with the indicated content; based on determining to generate additional search suggestions for the search suggestion request, identifying additional content associated with the indicated content, wherein the additional content is associated with a different level of the hierarchical content than the indicated content; determining additional search suggestions associated with the additional content; incorporating the additional search suggestions into the set of search suggestions; and displaying at least a part of the set of search suggestions at the computing device. In an example, determining the set of search suggestions comprises accessing a pre-generated search suggestion data store at the computing device. In another example, the method further comprises: evaluating the search suggestion data store to determine whether to perform an update; and when it is determined to perform an update, generating a request for updated search suggestion information. In a further example, the method further comprises: evaluating a number of search suggestions in the set of search suggestions based on a predetermined threshold to determine whether to generate additional search suggestions for the search suggestion request. In yet another example, determining to generate additional search suggestions comprises evaluating one or more search suggestions of the set of search suggestions based on relevance to the search query. In a further still example, the set of search suggestions comprises only search suggestions that are associated with the additional content.

In a further aspect, the technology relates to a method for generating a set of search suggestions for a search query. The method comprises: receiving a search suggestion request, wherein the search suggestion request comprises a search query and context information indicating content within a data store comprising hierarchical content; generating a set of search suggestions based on the search query, wherein each suggestion of the set of search suggestions is associated with the indicated content; based on determining to generate additional search suggestions, identifying additional content within the data store associated with the indicated content, wherein the additional content is associated with a different level of the hierarchical content than the indicated content; generating additional search suggestions in the set of search suggestions based on the search query, wherein the additional search suggestions are associated with the additional content; and providing at least a part of the set of search suggestions in response to the search suggestion request. In an example, the method further comprises: ranking the set of search suggestions based on the context information. In another example, the method further comprises: evaluating a number of search suggestions in the set of search suggestions based on a predetermined threshold to determine whether to generate additional search suggestions. In a further example, the method further comprises: evaluating one or more search suggestions of the set of search suggestions based on relevance to the search query to determine whether to generate additional search suggestions. In yet another example, providing at least a part of the set of search suggestions comprises providing information about a hierarchy level for at least one search suggestion of the set of search suggestions. In a further still example, providing at least a part of the set of search suggestions comprises selecting a number of search suggestions from the set of search suggestions based on a quantity indication in the received context information. In another example, the set of search suggestions comprises only search suggestions that are associated with the additional content.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform operations, comprising:
      receiving a partial search query;
      determining context information associated with the partial search query, the context information corresponding to user activity data;
      determining, in a data store comprising hierarchical content, a first hierarchical level that is related to the context information;
      generating a first set of search suggestions for the partial search query, wherein each search suggestions of the first set of search suggestions is associated with the first hierarchical level;
      in response to generating the first set of search suggestions, evaluating quality of the first set of search suggestions based on a relevance metric determined using an automated relevancy ranking module, wherein the relevance metric indicates a relevancy of the first set of search suggestions to the partial search query;

based on determining the quality of the first set of search suggestions is below a threshold, generating a second set of search suggestions for the partial search query, each search suggestion of the second set of search suggestions being associated with a second hierarchical level of the data store, wherein the second hierarchical level is related to the user activity data and is different than the first hierarchical level; and providing the first set of search suggestions and the second set of search suggestions in response to the partial search query, wherein the first set of search suggestions is provided with an indication of the first hierarchical level and the second set of search suggestions is provided with an indication of the second hierarchical level.

2. The system of claim 1, further comprising instructions for ranking at least one of the first set of search suggestions or the second set of search suggestions based on the context information.

3. The system of claim 1, further comprising instructions for evaluating a number of search results in the first set of search suggestions based, at least in part, on whether the number of search results from the data store satisfies a predetermined threshold.

4. The system of claim 1, further comprising instructions for evaluating one or more search results of the first set of search suggestions based, at least in part, on relevance to the partial search query to determine whether to generate additional search results.

5. The system of claim 1, wherein providing the first set of search suggestions and the second set of search suggestions comprises providing information about a hierarchical level for each search result of the first set of search suggestions or the second set of search suggestions.

6. The system of claim 1, wherein providing the first set of search suggestions and the second set of search suggestions comprises selecting a number of search results from the first set of search suggestions or the second set of search suggestions based on a quantity indication in the context information.

7. The system of claim 1, further comprising instructions for evaluating quality of the second set of search suggestions based on the relevance metric.

8. A method for generating a set of search results for a search query, comprising:

receiving, at a computing device, a partial search query and context information, the context information corresponding to user activity data;

determining an indication of a first hierarchical level of hierarchical content stored in a data store, wherein the first hierarchical level is related to the context information;

determining a first set of search results based on the partial search query, wherein one or more search results of the first set of search results is associated with the first hierarchical level;

in response to determining the first set of search results, evaluating quality of the set of search results based on a relevance metric determined using an automated relevancy ranking module, wherein the relevance metric indicates a relevancy of the set of search results to the partial search query;

based on determining the quality of the first set of search results is below a threshold, identifying additional content, generating a second set of search suggestions for the partial search query, each search suggestion of the second set of search suggestions being associated with a second hierarchical level of the data store and wherein the second hierarchical level is different than the first hierarchical level; and providing the first set of search results and the second set of search results in response to the partial search query, wherein the first set of search results is provided with an indication of the first hierarchical level and the second set of search results is provided with an indication of the second hierarchical level.

9. The method of claim 8, wherein determining the first set of search results comprises accessing a pre-generated search result data store at the computing device.

10. The method of claim 9, further comprising:
evaluating the search result data store to determine whether to perform an update; and
when it is determined to perform an update, generating a request for updated search result information.

11. The method of claim 8, further comprising:
evaluating a number of search results in the first set of search results based on a predetermined threshold to determine whether to generate additional search results for the partial search query.

12. The method of claim 11, wherein determining to generate additional search results comprises evaluating one or more search results of the first set of search results based on relevance to the partial search query.

13. The method of claim 8, further comprising:
evaluating quality of the second set of search suggestions based on the relevance metric.

14. A device comprising:
a processor; and
memory storing instructions that, when executed, causes the device to perform operations comprising:
receiving a partial search query and context information;
determining an indication of a first hierarchical level of hierarchical content stored in a data store, wherein the first hierarchical level is related to the context information corresponding to user activity data;
generating a first set of search results based on the partial search query, wherein each search result of the first set of search results is associated with the first hierarchical level;
in response to generating the first set of search results, evaluating quality of the first set of search results based on a relevance metric determined using an automated relevancy ranking module, wherein the relevance metric indicates a relevancy of the first set of search results to the partial search query;
based on determining the quality of the first set of search results is below a threshold, generating a second set of search suggestions for the partial search query, each search suggestion of the second set of search suggestions being associated with a second hierarchical level of the data store, and wherein the second hierarchical level is related to the user activity data and is different than the first hierarchical level; and providing the first set of search suggestions and the second set of search suggestions in response to the partial search query, wherein the first set of search suggestions is provided with an indication of the first hierarchical level and the second set of search suggestions is provided with an indication of the second hierarchical level.

15. The device of claim 14, further comprising:
ranking at least one of the first set of search suggestions or the second set of search results based on the context information.

16. The device of claim 14, further comprising:
evaluating a number of search results in the first set of search results based on a predetermined threshold to determine whether to generate additional search results.

17. The device of claim 14, further comprising:
evaluating one or more search results of the first set of search results based on relevance to the partial search query to determine whether to generate additional search results.

18. The device of claim 14, wherein providing the first set of search suggestions and the second set of search suggestions comprises providing information about a hierarchical level for each search result of the first set of search suggestions or the second set of search suggestions.

19. The device of claim 14, wherein providing the first set of search suggestions and the second set of search suggestions comprises selecting a number of search results from the first set of search suggestions or the second set of search suggestions based on a quantity indication in the context information.

20. The device of claim 14, wherein the quality of the first set of search results is determined based on analyzing one or more search suggestions using the context information.

\* \* \* \* \*